UNITED STATES PATENT OFFICE.

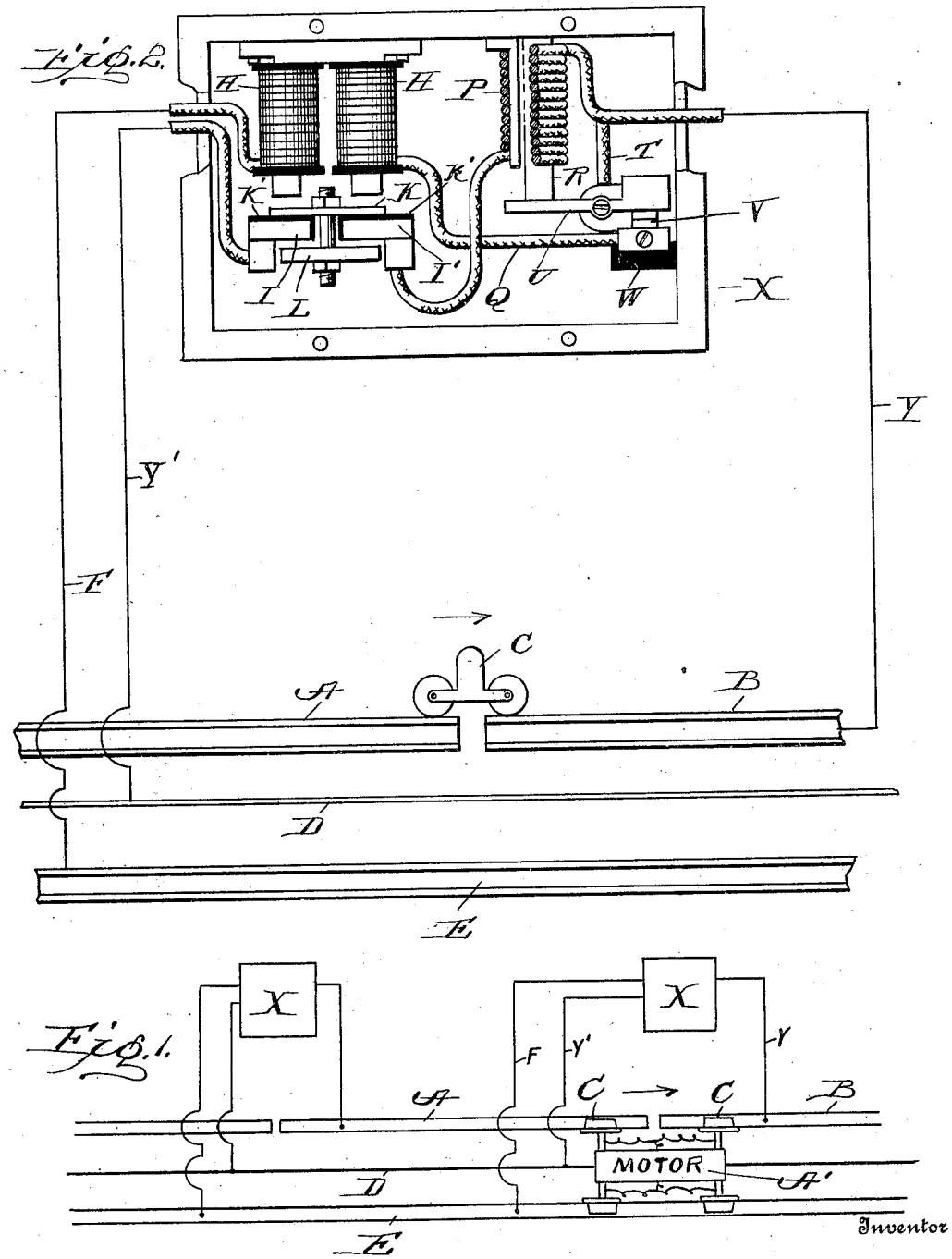

ROY ALEXANDER WEAGANT, OF DERBY LINE, VERMONT, ASSIGNOR OF ONE-FIFTIETH TO JEROME T. FLINT AND TWO-FIFTIETHS TO ANNIE G. FLINT, OF DERBY LINE, VERMONT, AND TWO-FIFTIETHS TO ROBERT J. MEEKREN, OF STANSTEAD, CANADA.

SYSTEM FOR THE DISTRIBUTION OF ELECTRIC POWER FOR TRACTION PURPOSES.

No. 914,365.     Specification of Letters Patent.     Patented March 2, 1909.

Application filed June 8, 1906. Serial No. 320,760.

*To all whom it may concern:*

Be it known that I, ROY A. WEAGANT, a citizen of the United States of America, residing at Derby Line, in the county of Orleans, in the State of Vermont, have invented a new and useful System for the Distribution of Electric Power for Traction Purposes, of which the following is a specification.

My invention consists of certain electrically operated devices by means of which a conductor, such as the rail of an electric railroad, laid in any approved manner, as upon the ground in the usual manner of laying rails, and in sections insulated from each other or separated by air gaps, whereby insulation is secured, is automatically connected to and disconnected from a continuous conductor, the said automatic connection being the result of the passage of a car or other vehicle from one section to another.

An object of the present invention is to employ improved means whereby all section of the track, except that upon which the car or vehicle is moving is dead, while current is supplied to the track section upon which the car or vehicle is moving, to propel such vehicle without the use of an overhead trolley wire, third rail, underground conduit, or any of the ordinary methods usually employed for supplying electric current to such vehicle.

A further object of the invention is to provide a main conductor disposed in any approved manner as buried in the ground above the track or in any approved place in connection by means of a broken circuit with a switch box, the circuit with which such switch box is closed when a train passes into the section with which the switch box is broken.

In the drawings:—Figure 1 is a diagrammatic view of two sections associated with a conventional motor and switch boxes. Fig. 2 is a diagrammatic representation of the adjacent ends of two sections with the switch box shown in detail.

Like characters of reference designate corresponding parts throughout the several views.

Two rail sections A and B are insulated from each other in any approved manner by the air gap as shown in Fig. 2 or as may be found desirable, and the vehicle traveling upon the track of which the sections A and B are a part, is provided with any approved means for taking current from such rails A and B, as the wheels of the vehicle itself or a separate shoe or trolley shown at C.

A main conductor D is provided being continuous and carrying at all times the motive power, such conductor being associated with relation to the rails in any approved manner as suspended above or buried beneath. The return current is taken care of by the opposite rail E, the current passing from the sections A or B through the motor A or to the return rail E.

At some convenient point and associated with the adjacent ends of sections A and B is a switch box X having the switching mechanism disposed within the switch box as hereinafter described, and electrically connected with one of the sections as B by the wire Y and with the conductor D by means of the wire Y'. Within the switch box X the wire Y passes about and forms the coil of a solenoid P within which the movable core R is adapted to reciprocate vertically and to normally bear upon the lever U which is weighted at its opposite end with a weight sufficient to overbalance the core R in normal position. The lever U is also electrically connected with the wire Y by means of the wire T, and when in normal position the lever U contacts with the contact V which is carried upon insulations W within the box. From the contact V a conductor Q leads to an electro magnet H here shown as composed of two coils and from such magnet continues as the wire F to the return rail E. From the solenoid P the winding continues to the contact I' which is spaced from the contact I and insulated therefrom by an air gap or otherwise, and from such contact I continues by the conductor Y' to the conductor D.

The upper portions of the contacts I and I' are provided with insulations K' upon which rests the armature K normally until attracted by the cores of the electro magnet H, when the armature is raised, raising therewith the contact member L to close the circuit between the contacts I and I'.

In operation the trolley or shoe C, by which the car or locomotive is connected with one of the sectional conductors, shown as the rails A or B, passing from one section as A to the next section as B, causes the electro magnet H to be excited for the reason that the section A is already energized as will hereinafter appear, and the passing of the shoe or trolley C from the section A to the section B causes the section B to be momentarily energized from the section A thereby energizing the magnet H through the wires Y and T, the contact V and wire Q passing through the coil P being prevented by reason of the circuit being broken between the contacts I and I', and passing through such electro magnet to the return rail E. The exciting of the magnet H energizes the core of such magnet and attracts the armature K and carries with it the contact member L closing thereby the circuit by contact with the contacts I and I'. The closing of the circuit passing through the winding P of the solenoid causes the core R to be drawn upwardly and by reason of the exceedingly great resistance of the cores H, but little current will pass through such electro magnet, while the circuit through the contacts I and I' is completed. When the car or vehicle passes to the next section or is stopped the current being interrupted the heavy current flow through the solenoid P is reduced to that which passes through the high resistance winding H and is no longer sufficient to support the core R, which thereupon falls, and engaging the weighted lever U, depresses the same by impact and raises the weighted end and thus breaks the contact with the contact member B breaking the circuit to the electro magnets H, whereupon the armature K falls, breaking the circuit to the solenoid P, and the entire device is thereupon dead and ready to be again operated a car coming upon the line and the sections A and B are no longer energized.

I claim—

1. In a device of the class described, a direct and an auxiliary circuit, means actuated by the auxiliary circuit adapted to close the direct circuit, a solenoid in the direct circuit, a core adapted to be raised by the solenoid, a switch in the auxiliary circuit adapted to be opened by the impact of the falling core when the direct circuit is interrupted.

2. In a device of the class described, a direct and an auxiliary circuit, means actuated by the auxiliary circuit adapted to close the direct circuit, a solenoid in the direct circuit, a core adapted to be raised by the solenoid, a switch in the auxiliary circuit normally maintained in a closed condition by gravity and adapted to be opened by the impact of the falling core when the direct circuit is interrupted.

3. In a device of the class described, an auxiliary circuit, a pivotal switch in said circuit having a weight at one end, a direct circuit, a solenoid disposed in the direct circuit, a core disposed within the solenoid and proportioned when released by the interruption of the direct circuit to strike the switch opposite the weighted end and by impact to open such switch.

Signed at Derby Line in the county of Orleans, and State of Vermont, this 6th day of June, 1906.

ROY ALEXANDER WEAGANT.

Witnesses:
WINTHROP K. HARDING,
R. C. PARSONS.